United States Patent
Kitabata

(10) Patent No.: US 9,822,575 B2
(45) Date of Patent: Nov. 21, 2017

(54) MOVABLE BODY DRIVING DEVICE

(75) Inventor: Atsushi Kitabata, Suzuka (JP)

(73) Assignee: FUJI ELECTRIC CO., LTD., Kawasaki-Shi (JP)

( * ) Notice: Subject to any disclaimer, the term of this patent is extended or adjusted under 35 U.S.C. 154(b) by 1451 days.

(21) Appl. No.: 12/656,042

(22) Filed: Jan. 14, 2010

(65) Prior Publication Data

US 2010/0212229 A1    Aug. 26, 2010

(30) Foreign Application Priority Data

Feb. 23, 2009    (JP) .................. 2009-039005

(51) Int. Cl.
  *E05F 15/635*    (2015.01)
  *F16H 19/04*    (2006.01)
  *E05F 15/655*    (2015.01)

(52) U.S. Cl.
  CPC .......... *E05F 15/635* (2015.01); *E05F 15/655* (2015.01); *F16H 19/04* (2013.01); *E05Y 2900/51* (2013.01); *Y10T 74/18056* (2015.01)

(58) Field of Classification Search
  CPC ...... E05F 15/635; E05F 15/655; F16H 19/04; E05Y 2900/51; Y10T 74/18056
  USPC .......................................... 49/362, 360, 409
  See application file for complete search history.

(56) References Cited

U.S. PATENT DOCUMENTS

| | | | | |
|---|---|---|---|---|
| 1,023,723 A * | 4/1912 | Cossey | ............................ | 49/116 |
| 1,776,163 A * | 9/1930 | Mayer | ................................ | 16/88 |
| 1,917,415 A * | 7/1933 | Woodruff | ......................... | 49/100 |
| 5,388,370 A * | 2/1995 | Tonsmann | ....................... | 49/100 |
| 6,708,448 B2 * | 3/2004 | Zappa | ............................... | 49/41 |
| 2007/0251150 A1 | 11/2007 | Harie | | |

FOREIGN PATENT DOCUMENTS

| | | |
|---|---|---|
| JP | S59-067474 U | 5/1984 |
| JP | H09-151668 A | 6/1997 |
| JP | H11-280336 A | 10/1999 |
| KR | 100805364 B1 | 2/2008 |

* cited by examiner

*Primary Examiner* — Gregory Strimbu
(74) *Attorney, Agent, or Firm* — Manabu Kanesaka

(57) ABSTRACT

A movable body driving device includes upper and lower racks movable in a lengthwise direction; a motor which can rotate forward and backward; a drive pinion fixed to a rotary shaft of the motor; and a driven pinion engaging the upper and lower racks. The driven pinion is driven to rotate by the upper rack to thereby drive the lower rack linearly in a direction reverse to the upper rack. A sliding door is connected to the lower rack and is opened or closed in accordance with forward or backward rotation of the motor.

10 Claims, 2 Drawing Sheets

MOVABLE BODY DRIVING DEVICE

BACKGROUND OF THE INVENTION AND RELATED ART STATEMENT

The present invention relates to a movable body driving device for automatically opening and closing a door of a vehicle such as a train.

For example, a technique using a linear motor is commonly known as a background-art technique of applying a movable body driving device to a drive device for opening and closing a vehicle door. When such a linear motor used for a vehicle is a movable coil type driving device, the length of a stator is structurally equal to the sum of the length of a door stroke and the length of a moving member. The length of the door stroke is generally in a range from 600 mm to 900 mm.

There is, however, a problem that the linear motor becomes expensive because the linear motor requires a large quantity of rare-earth permanent magnets as permanent magnets in addition to increase in device size.

In order to achieve both reduction in device size and reduction in cost, a movable body driving device including a motor equipped with an encoder for controlling the velocity and direction of rotation of the motor, a pinion driven to rotate by the motor, and upper and lower racks driven to move linearly by the pinion has been therefore known as a technique according to the background art (e.g. see JP-A-2007-297796).

In the movable body driving device, when the motor rotates either forward or backward, the pinion fixed to a motor shaft rotates either forward or backward accordingly so that the upper and lower racks move laterally in the reverse directions.

One of the left and right doors is attached to the upper rack through an upper rack connection and door hangers while the other of the left and right doors is attached to the lower rack through a lower rack connection and door hangers. The left and right doors are opened and closed when the upper and lower racks move laterally in the directions reverse to each other.

Only one pinion is disposed in the center of the movable body driving device. As a drive method for opening and closing a door, the pinion disposed in the center of the movable body driving device is paired exclusively with either one of the upper and lower racks so as to correspondingly drive either one of the left and right doors.

FIGS. 2A and 2B are views showing an example of one door to be opened/closed for easy understanding of the structure and operating state of the movable body driving device according to the background art, which operates so that the pinion is paired exclusively with either one of the racks. FIG. 2A shows a state when the door 1 is in a closed position 2, and FIG. 2B shows a state when the door 1 is in an open position.

As shown in FIGS. 2A and 2B, a pinion 4 fixed to one end of a power shaft of a motor 3 is housed, together with a rack 5 engaging the pinion 4, in a rack and pinion housing 6.

The door 1 is connected to the rack 5 through a connection 7 and two door hangers 8. Two guide rollers 12 are attached to each of the door hangers 8 which are connected to opposite end portions of the door 1, respectively. The two guide rollers 12 are loosely fitted into a rail groove 11 formed in a lower end portion of a door rail 9 so that the two guide rollers 12 guide the opening/closing movement of the door 1.

One adjusting roller 13 is disposed between the two guide rollers 12 in order to suppress rattling noise generated during the opening/closing operation of the door 1 due to play of the two guide rollers 12 with respect to the rail groove 11.

In order to prevent the two guide rollers 12 and the adjusting roller 13 in the door hanger 8 connected to a right end portion of the door 1 in a close position from dropping out of the rail groove 11, a right end portion of the rack and pinion housing 6 is extended to the same position as a right end portion 14 of the door 1 in a close position. Incidentally, a cushioning member 15 made of a rubber member or the like is attached to the right end portion 14 of the door 1 in order to prevent an accident during the closing of the door.

In the example shown in FIGS. 2A and 2B, the position of the pinion 4, i.e. the position of the motor 3 where the pinion 4 is fixed to one end of the power shaft of the motor 3 is determined to be a position at a distance A from a left end portion 16 of the door 1 when the door 1 is closed, because of the circumstances where the whole device is attached.

Accordingly, a left end portion of the rack 5 connected to the door 1 is always located at a distance A+d left from the left end portion 16 of the door 1. The distance d is a length of play provided on the left side from the center position of the pinion 4 so that the pinion 4 can engage the rack 5 stably when the door 1 is in a close position shown in FIG. 2A.

In this configuration, when the pinion 4 rotates clockwise in FIG. 2A from the close position shown in FIG. 2A, the rack 5 moves left so that the door 1 connected to the rack 5 through the connection 7 and the two door hangers 8 moves to the open position shown in FIG. 2B. In this manner, the door 1 is opened.

On this occasion, the left end portion of the rack 5 is located at the distance A+d left from the left end portion 16 of the door 1 as described above. Accordingly, the length of the rack and pinion housing 6 is equal to a length from a right end portion corresponding to the right end portion 14 of the door 1 in the close position as shown in FIG. 2A to a left end portion located at a distance A+d+e (obtained by adding up the distance A, the distance $\underline{d}$ and the length $\underline{e}$ of play) from the left end portion of the door 1 in the open position shown in FIG. 2B.

As described above, the rack and pinion mechanism in the vehicle door driving device according to the background art structurally requires a length corresponding to left and right door opening/closing movement distances from the center position of the pinion. Each of the left and right door opening/closing movement distances is generally in a range of from 600 mm to 900 mm.

That is, in the rack and pinion structure according to the background art, the total length of the rack and pinion housing 6, i.e. the total length of the device as a whole, is determined based on the position of the pinion because the pinion is paired exclusively with either one of the racks. In other words, the total length of the device depends on the position of the pinion.

When the vehicle door driving device according to the background art is applied to a door driving device having a motor directly attached to a pinion, the position of the motor is equal to the position of the pinion. Since the position where the motor is attached to the vehicle is limited, the total length of the device determined based on the position of the pinion may become long because of the position where the motor is attached. In this case, there arises a problem that it is difficult to attach the device to the vehicle in accordance with the circumstances of the body of the vehicle.

Even if the position for arrangement of the pinion is shifted in order to avoid occurrence of such a problem, the problem cannot be solved because the pinion will excessively occupy a space for rigging the vehicle body in other respects.

In order to solve the problem, an object of the invention is to provide a movable body driving device whose total length can be fixed to be short.

Further objects and advantages of the invention will be apparent from the following description of the invention.

SUMMARY OF THE INVENTION

The movable body driving device according to the invention includes: a housing portion made of a rack and pinion housing; first and second linearly movable bodies made of upper and lower racks which are disposed in upper and lower portions of the housing portion so as to be movable in a lengthwise direction of the housing portion; a rotation actuator made of a motor which can rotate forward and backward; a first rotation transmission body made of a drive pinion which is fixed to a power shaft of the rotation actuator and which moves one of the first and second linearly movable bodies linearly; and a second rotation transmission body made of a driven pinion which engages one of the first and second linearly movable bodies driven to move linearly by the first rotation transmission body and which is driven to rotate by one of the first and second linearly movable bodies to thereby move the other of the first and second linear movable bodies in a direction reverse to one of the first and second linear movable bodies in accordance with the rotation operation of one of the first and second linear movable bodies, wherein a top-railed sliding door connected to either one of the upper and lower racks through a connection and door hangers is opened and closed through the drive pinion and either one of the upper and lower racks in accordance with forward and backward rotation of the motor.

The invention provides an effect to be capable of providing a movable body driving device whose total length can be fixed to be short.

DETAILED DESCRIPTION OF PREFERRED EMBODIMENTS

Embodiments of the invention will be described below in detail.

Embodiment 1

Figure 1A:
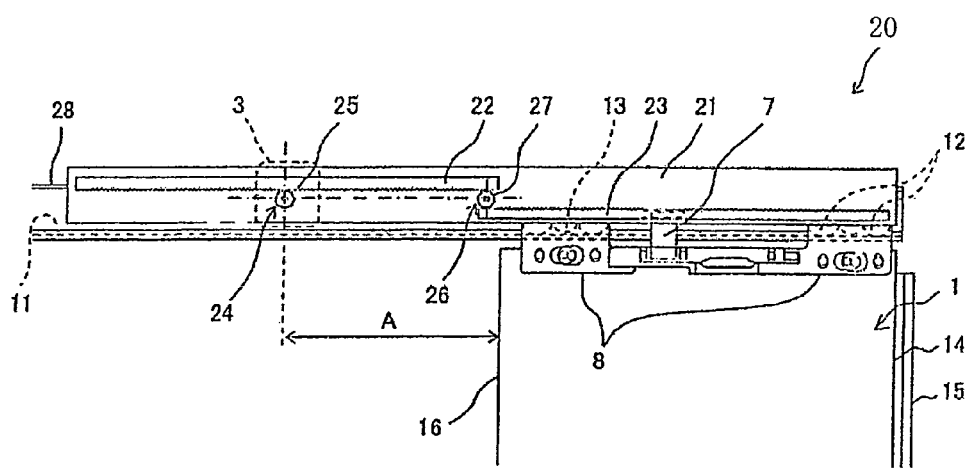
FIG. 1A is a view showing an overall configuration and an operating state of a movable body driving device according to Embodiment 1 of the invention when one door is driven by one motor in the movable body driving device, and the door is closed.
Figure 1B:
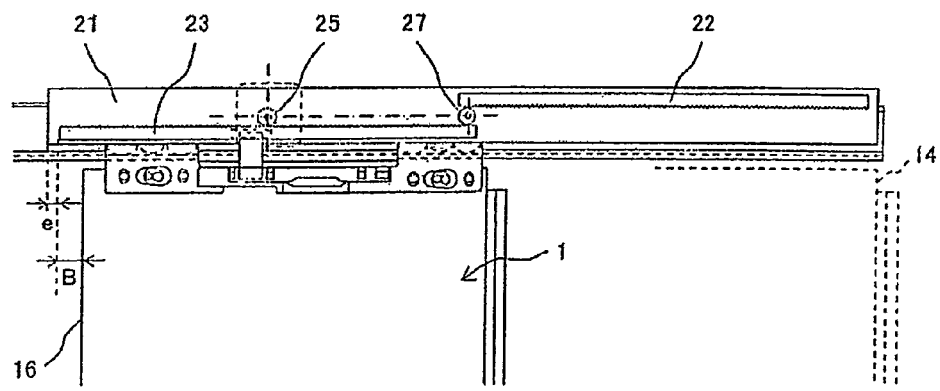
FIG. 1B is a view showing an overall configuration and an operating state of a movable body driving device according to Embodiment 1 of the invention when one door is driven by one motor in the movable body driving device, and the door is opened.

FIGS. 1A and 1B are views showing an overall configuration and an operating state of a movable body driving device according to Embodiment 1 of the invention when one door is driven by one motor in the movable body driving device. Incidentally, FIG. 1A shows a state when the door 1 is in a close position whereas FIG. 1B shows a state when the door 1 is in an open position.

Figure 2A:
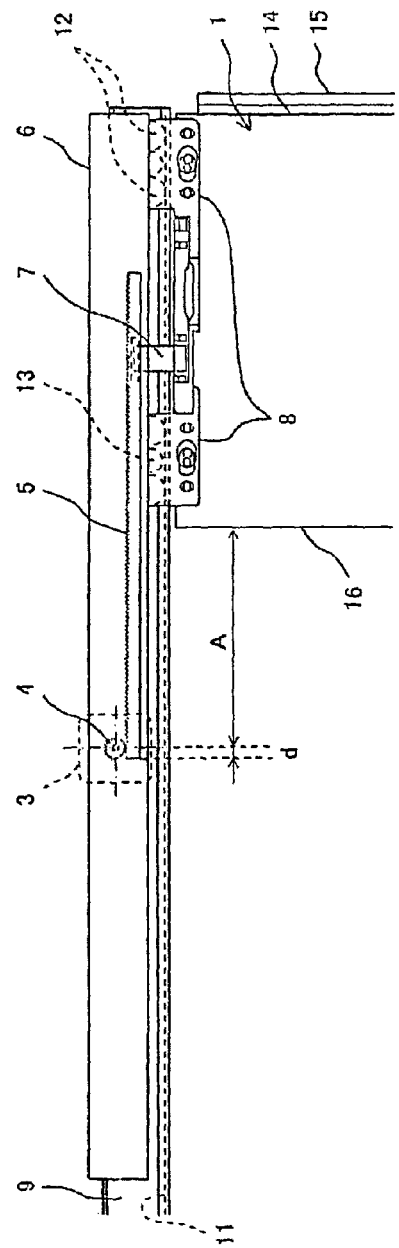
FIG. 2A is a view showing an example of one door to be closed for easy understanding of an overall configuration and an operating state of a movable body driving device according to the background art, which operates so that a pinion is paired exclusively with either one of racks.
Figure 2B:
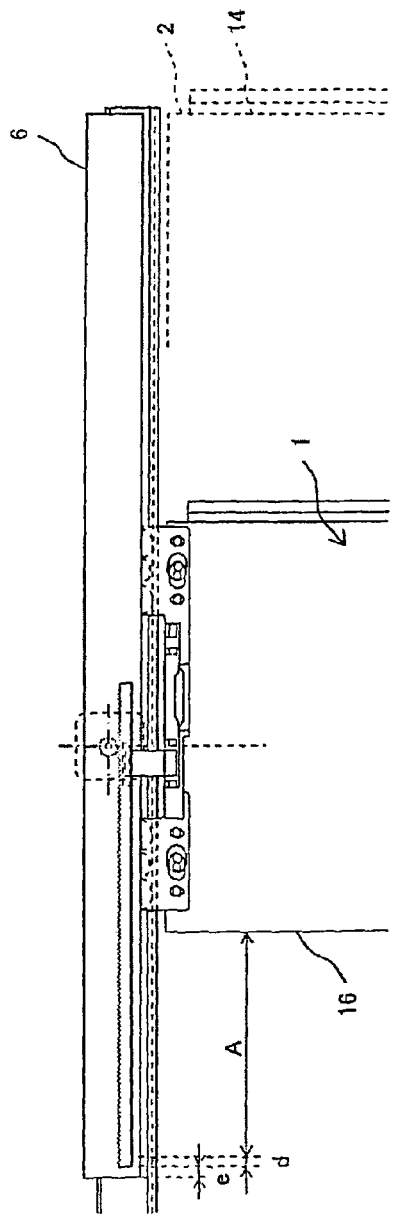
FIG. 2B is a view showing an example of one door to be opened for easy understanding of an overall configuration and an operating state of a movable body driving device according to the background art, which operates so that a pinion is paired exclusively with either one of racks.

In FIGS. 1A and 1B, constituent parts same as those in FIGS. 2A and 2B are referred to by numerals same as those in FIGS. 2A and 2B, so that redundant description thereof will be omitted. Constituent parts only according to Embodiment 1 are referred to by different numerals from those in FIGS. 2A and 2B, so that configuration and operation of the constituent parts given with the different reference numerals will be mainly described below.

As shown in FIG. 1A, the movable body driving device 20 according to Embodiment 1 of the invention includes a rack and pinion housing 21, an upper rack 22, and a lower rack 23. The rack and pinion housing 21 serves as a housing portion. The upper rack 22 serves as a first linearly movable body. The lower rack 23 serves as a second linearly movable body. The upper rack 22 and the lower rack 23 are disposed in upper and lower portions of the rack and pinion housing 21 so as to be movable in a lengthwise direction of the rack and pinion housing 21.

Further, a drive pinion 25 which serves as a first rotation transmission body is disposed in a first position 24 between a movement path of the upper rack 22 and a movement path of the lower rack 23. This drive pinion 25 is located so that the distance between the center (the first position 24) of the drive pinion 25 and a left end portion 16 of the door 1 when the door 1 is closed takes the same distance A as in the pinion 4 shown in FIGS. 2A and 2B.

The drive pinion 25 is integrated with one end of a rotary shaft (power shaft) of a motor 3 so as to be fixed thereto. The motor 3 serves as a rotation actuator. When the door 1 is closed as shown in FIG. 1A, the drive pinion 25 engages a substantially central portion of the upper rack 22 and waits for driving of the upper rack 22 to linearly move right in FIG. 1A in accordance with forward (clockwise in FIG. 1A) rotation of the motor 3.

When the door 1 is opened as shown in FIG. 1B, the drive pinion 25 is located above a substantially central portion of the sliding door and engages a substantially central portion of the lower rack 23; and waits for driving the lower rack 23 to linearly move right in FIG. 1B in accordance with backward (counterclockwise in FIG. 1B) rotation of the motor 3.

Further, a driven pinion 27 which serves as a second rotation transmission body is disposed in a second position 26 between the movement path of the upper rack 22 and the movement path of the lower rack 23. The position (second position 26) where the driven pinion 27 is disposed is not limited as long as the driven pinion 27 can always engage both the upper and lower racks 22 and 23.

In the example shown in FIGS. 1A and 1B, the upper and lower racks 22 and 23 are formed so that the distance between the upper and lower racks 22 and 23 is as short as possible. Accordingly, the driven pinion 27 is located above one edge area of the sliding door to engage a right end portion of the upper rack 22 and a left end portion of the lower rack 23 when the door 1 is closed, but the driven pinion 27 is located above another edge area of sliding door to engage a left end portion of the upper rack 22 and a right end portion of the lower rack 23 when the door 1 is opened.

The driven pinion 27 is driven to rotate following a linear movement of the upper rack 22 (or the lower rack 23) and transmits its rotating operation to the lower rack 23 (or the upper rack 22) to linearly move the lower rack 23 (or the upper rack 22) in a direction reverse to the other rack 22 (or 23).

A connection 7 is screwed to the lower rack 23. The connection 7 is connected to door hangers 8 so as to allow for predetermined play in the upper, lower, left and right directions. The door 1 is connected to the door hangers 8.

Lower portions of guide rollers 12 of the door hangers 8 are fitted into a rail groove 11 of a door rail 28. Thus, while the door 1 is slidably held so as to be suspended to the door rail 28 through the door hangers 8, the guide rollers 12, and the rail groove 11 on one hand, the door 1 is connected to the lower rack 23 through the door hangers 8 and the connection 7 on the other hand.

In the movable body driving device 20 according to the embodiment shown in FIGS. 1A and 1B, when the motor 3 rotates forward in the condition that the door 1 is in a close position shown in FIG. 1A, that is, when the drive pinion 25 rotates clockwise in FIG. 1A, the upper rack 22 begins to move right to rotate the driven pinion 27 clockwise.

Since the driven pinion 27 engages both the upper rack 22 and the lower rack 23, the clockwise rotation of the driven pinion 27 actuated by the upper rack 22 is transmitted to the lower rack 23 so that the lower rack 23 begins to move left in FIG. 1A (in a direction reverse to the direction of movement of the other rack, i.e. the upper rack 22).

As the operation goes on, the lower rack 23 which has not engaged the drive pinion 25 begins to engage the drive pinion 25 while the upper rack 22 which has engaged the drive pinion 25 contrariwise disengages from the drive pinion 25.

When the drive pinion 25 transmits its own driving force while the rack to which the driving force is transmitted is changed from the upper rack 22 to the lower rack 23 in this manner, the door 1 can be opened as shown in FIG. 1B.

When the motor 3 rotates backward in the condition that the door 1 is in the open position shown in FIG. 1B, that is, when the drive pinion 25 rotates counterclockwise in FIG. 1B, the lower rack 23 begins to move right to rotate the driven pinion 27 counterclockwise.

The counterclockwise rotation of the driven pinion 27 actuated by the lower rack 23 is transmitted to the upper rack 22 so that the upper rack 22 begins to move left (in a direction reverse to the direction of movement of the other rack, i.e. the lower rack 23) in FIG. 1B.

As the operation goes on, the upper rack 22 which has not engaged the drive pinion 25 begins to engage the drive pinion 25 while the lower rack 23 which has engaged the drive pinion 25 contrariwise disengages from the drive pinion 25.

When the drive pinion 25 transmits its own driving force while the rack to which the driving force is transmitted is changed from the lower rack 23 to the upper rack 22 in this manner, the door 1 can be closed as shown in FIG. 1A.

On this occasion, the left end portion of the lower rack 23 is located at a distance B left from the left end portion 16 of the door 1. Accordingly, the length of the rack and pinion housing 21 is equal to a length from a right end portion corresponding to the right end portion 14 of the door 1 in the close position shown in FIG. 1A to a left end portion at a distance B+e (obtained by adding a length $\underline{e}$ of play to the distance B) from the left end portion 16 of the door 1 in the open position shown in FIG. 1B.

When FIG. 1B is compared with FIG. 2B according to the background art, it is obvious that (B+e)<<(A+d+e). That is, in the embodiment, the length of the rack and pinion housing 21 can be set to be as extremely short as possible in comparison with the background art.

As described above, in accordance with the embodiment of the invention, the power from the drive pinion is transmitted directly from the upper rack to the lower rack (or from the lower rack to the upper rack) so that the total length of the movable body driving device 20 can be set to be short and this setting can be fixed without any change.

Moreover, the position where the drive pinion is disposed is not limited as long as the position is in the range of the distance A shown in FIG. 1A. Accordingly, the setting position of the motor can be selected relatively freely so that it is possible to avoid such a situation that the movable body driving device 20 cannot be attached to the vehicle according to the circumstances of the vehicle.

Embodiment 2

Although Embodiment 1 has been described in the case where the door 1 is connected to the lower rack 23, the method of connecting the door 1 to a rack is not limited thereto. The door 1 may be connected to the upper rack, though not particularly shown in FIGS. 1A and 1B.

In this case, the door 1 is in an open position when the positional relation between the drive pinion 25 and the upper and lower racks 22 and 23 is shown in FIG. 1A, whereas the door 1 is in a close position when the positional relation between the drive pinion 25 and the upper and lower racks 22 and 23 is shown in FIG. 1B.

Also in this case, various operations such as rotation of the motor 3, rotation of the drive pinion 25, movement of the upper and lower racks 22 and 23 and rotation of the driven pinion 27 are the same as those in Embodiment 1.

The invention can be applied to a driving device using a rack and pinion mechanism, such as a movable body driving device for opening and closing a top-railed sliding door or the like.

The disclosure of Japanese Patent Application No. 2009-039005 filed on Feb. 23, 2009 is incorporated as a reference.

While the invention has been explained with reference to the specific embodiments of the invention, the explanation is illustrative and the invention is limited only by the appended claims.

What is claimed is:

1. A movable body driving device, comprising:
   a sliding door;
   first and second linearly movable bodies disposed in respective upper and lower portions of a housing portion, said second linearly movable body being connected to the sliding door so as to be movable in a lengthwise direction of the housing portion;
   a first rotation transmission body which is located in a first position between movement paths of the first and second linearly movable bodies and which engages one of the first and second linearly movable bodies;
   a second rotation transmission body which is located in a second position between the movement paths of the first and second linearly movable bodies and which always engages the first and second linearly movable bodies; and a rotation actuator which has a power shaft connected to the first rotation transmission body;

wherein in one end position of the sliding door, the first rotation transmission body is positioned at a substantially central portion of the second linearly movable body, and the second rotation transmission body is positioned away from the first rotation transmission body and above one edge area of the second linearly movable body.

2. A movable body driving device according to claim 1, wherein the first and second linearly movable bodies move linearly in opposite directions with respect to each other.

3. A movable body driving device according to claim 1, wherein the housing portion is a rack and pinion housing;

the first and second linearly movable bodies are first and second racks disposed in the rack and pinion housing;

the rotation actuator is a motor which can rotate forward and backward;

the first rotation transmission body is a drive pinion which is provided so as to be fixed to the power shaft of the motor; and the second rotation transmission body is a driven pinion which engages the racks and which is driven to rotate by the first rack.

4. A movable body driving device according to claim 3, wherein the sliding door is a top-railed sliding door and is connected to second rack through a connection and door hangers, said sliding door being opened and closed through the drive pinion and the racks in accordance with the forward and backward rotations of the motor.

5. A movable body device driving according to claim 1, wherein in another end position of the sliding door, the first rotation transmission body is positioned away from the second linearly movable body, and the second rotation transmission body is positioned at another edge area of the second linearly movable body.

6. A movable body driving device according to claim 1, wherein the second linearly movable body supports the sliding door, and the first linearly movable body does not support the sliding door.

7. A movable body driving device according to claim 6, further comprising a rail groove and door hangers respectively connected to the sliding door and the second linearly movable body, the door hangers having rollers fitted into the rail groove.

8. A movable body driving device according to claim 7, wherein the rollers include guide rollers so as to guide the sliding door, and an adjusting roller disposed between the guide rollers so as to suppress rattling noise generated during an operation of the sliding door.

9. A movable body driving device, comprising:

a sliding door;

first and second linearly movable bodies disposed in respective upper and lower portions of a housing portion, said second linearly movable body being connected to the sliding door so as to be movable in a lengthwise direction of the housing portion;

a first rotation transmission body which is located in a first position between movement paths of the first and second linearly movable bodies and which engages one of the first and second linearly movable bodies;

a second rotation transmission body which is located in a second position between the movement paths of the first and second linearly movable bodies and which always engages the first and second linearly movable bodies; and a rotation actuator which has a power shaft connected to the first or second rotation transmission body;

wherein in one end position of the sliding door, the first rotation transmission body is positioned at a substantially central portion of the second linearly movable body, and the second rotation transmission body is positioned away from the first rotation transmission body and above one edge area of the second linearly movable body; and the first and second linearly movable bodies have substantially same lengths and are arranged such that when the first linearly movable body engages the first and second rotation transmission bodies, the second linearly movable body engages only the second rotation transmission body, and when the second linearly movable body engages the first and second rotation transmission bodies, the first linearly movable body engages only the second rotation transmission body.

10. A movable body driving device, comprising:

a sliding door;

first and second linearly movable bodies disposed in respective upper and lower portions of a housing portion, said second linearly movable body being connected to the sliding door so as to be movable in a lengthwise direction of the housing portion;

a first rotation transmission body which is located in a first position between movement paths of the first and second linearly movable bodies and which engages one of the first and second linearly movable bodies;

a second rotation transmission body which is located in a second position between the movement paths of the first and second linearly movable bodies and which always engages the first and second linearly movable bodies; and a rotation actuator which has a power shaft connected to the first or second rotation transmission body;

wherein in one end position of the sliding door, the first rotation transmission body is positioned at a substantially central portion of the second linearly movable body, and the second rotation transmission body is positioned away from the first rotation transmission body and above one edge area of the second linearly movable body; and in said one end position of the sliding door, the first rotation transmission body is positioned above a substantially central portion of the sliding door, and the second rotation transmission body is positioned away from the first rotation transmission body and above one edge area of the sliding door, and in another end position of the sliding door, the first rotation transmission body is positioned away from the sliding door, and the second rotation transmission body is positioned above another edge area of the sliding door.

* * * * *